Sept. 13, 1938.　　　　S. H. CALDWELL　　　　2,130,296
SPEED INDICATOR APPARATUS FOR MOTOR VEHICLES
Filed Aug. 31, 1936

*INVENTOR*
STUART H. CALDWELL
BY *Whittemore, Hulbert & Belknap*
*ATTORNEYS*

Patented Sept. 13, 1938

2,130,296

UNITED STATES PATENT OFFICE 2,130,296

SPEED INDICATOR APPARATUS FOR MOTOR VEHICLES

Stuart H. Caldwell, Detroit, Mich., assignor to Kelch Heater Company, Detroit, Mich., a corporation of Michigan Application August 31, 1936, Serial No. 98,811

6 Claims. (Cl. 250—41.5)

This invention relates generally to motor vehicles and refers more particularly to improvements in safety devices attachable to motor vehicles.

The present invention contemplates a safety device embodying means for imparting a signal to the operator of a vehicle when the rate of travel of the latter exceeds a speed capable of being pre-selected by the operator, and it is one of the principal objects of the present invention to provide a relatively, simple apparatus for accomplishing this result without restricting the maximum speed of the vehicle or interfering with the normal operation of the latter.

The present invention provides for simplifying the apparatus by embodying a photoelectric cell unit for actuating the signal and by utilizing a part of the speed indicating instrument for controlling the operation of the photoelectric cell.

A further object of the present invention resides in the provision of means under the control of the operator for pre-selecting the particular speed at which the signal is adapted to be operated by the photoelectric cell.

The foregoing, as well as other objects, will be made more apparent as this description proceeds, especially when considered in connection with the accompanying drawing, wherein.

Figure 1:
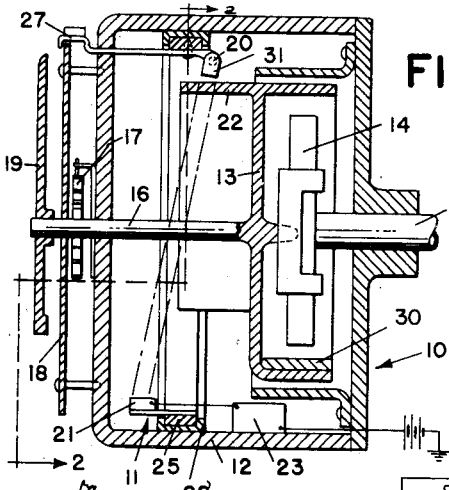
Figure 1 is a longitudinal sectional view through a speed indicator unit and photoelectric cell assembly.
Figure 2:
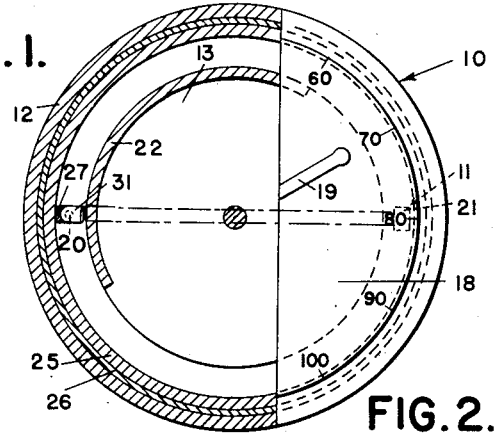
Figure 2 is a sectional view taken substantially on the line 2—2 of Figure 1.
Figure 3:
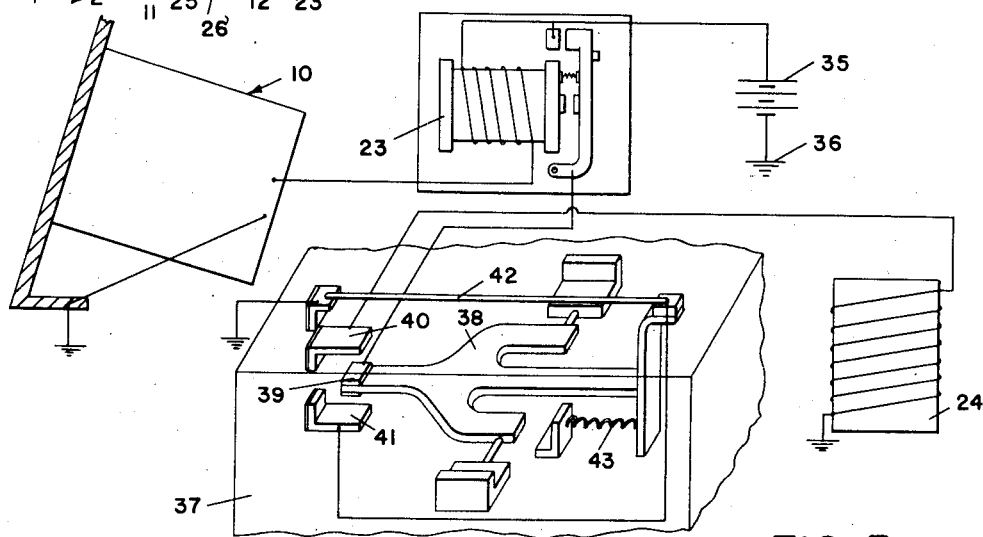
Figure 3 is a wiring diagram of the system.

Referring now more in detail to the particular construction of the safety device shown in Figures 1 to 4 inclusive, it will be noted that there is illustrated in Figure 1 a speedometer 10 of the magnetic type and a photoelectric cell unit 11 supported upon the casing 12 of the speedometer for operation by the mechanism of the latter. With the exception of a slight alteration in the speedometer rotor 13 necessary to operate the photoelectric cell and the presence of the latter in the speedometer assembly, the instrument is of conventional design and operates in accordance with any of the well-known magnetic speedometer units. Briefly, the speedometer consists of a magnet 14 driven by the usual speedometer cable 15 and rotatably supported within the inverted cup-shaped rotor 13. As shown in Figure 2, the rotor 13 is balanced in a bearing on the end of the magnet in axial alignment with the drive shaft 15 and is provided with a forwardly extending shaft portion 16 connected adjacent the outer end with the hairspring 17 in the usual manner. The extreme forward end of the shaft 16 projects through the indicating dial 18 of the speedometer and has secured thereto a balanced needle 19 adapted to be rotated across the dial by the shaft.

Speedometer units constructed in accordance with the foregoing are highly sensitive, and the accuracy of the same is extremely affected in the event an attempt is made to place any additional load on the driving parts. In order to preserve the accuracy of the speedometer, I utilize the photoelectric cell unit 11 for actuating the desired signal, and the only function of the speedometer in this combination is to intercept the light rays directed toward the photoelectric cell from the source of illumination. In detail, the source of illumination 20 and the photoelectric cell 21 are supported by the casing 12 of the speedometer at opposite sides of the rotor 13, which is provided with a forwardly extending shield 22 of sufficient dimension to intercept the light beam passing from the source of illumination 20 to the photoelectric cell 21.

Upon reference to Figure 2, it will be noted that the source of illumination 20 is supported on the speedometer casing at the side of the dial equipped with the lowest recorded speeds and the shield 22 is located at the corresponding side of the rotor 13 when the speedometer is at rest. With the arrangement briefly described above, it will be noted that the rays of light from the source of supply 20 are shielded from the photoelectric cell 21 until the trailing end of the shield 22 moves beyond the source of light 20. This permits the rays of light to be sighted by the photoelectric cell and, as a consequence, sufficient potential is generated in the cell to operate the relay or relays 23 and close an electric circuit to the signal 24. It necessarily follows, therefore, that the speed at which the signal is adapted to operate will depend upon the location of the source of light 20 relative to the trailing end of the shield 22. Thus, by adjusting the position of the source of light, the speed at which the signal operates may be varied, and this is accomplished in the present instance by mounting the source of illumination 20 and the photoelectric cell on an annular ring 25 enclosed in the speedometer casing and guided by means of a track 26 secured to the latter. In the present instance, the ring is rotated relative to the casing by a control handle 27 extending laterally through the front end of the speedometer dial directly opposite the source of light 20. Thus, when the control handle is positioned opposite any one of the recorded speeds on the dial, the source of light will be exposed by the shield to actuate the signal at the selected speed.

It will, of course, be understood that the length of the shield 22 is predetermined to provide for obtaining all of the desired speed variations, and the balance of the rotor is maintained by a weight 30 at the side of the rotor opposite the shield. Attention may also be called to the fact that the reflector 31 for the source of illumination is inclined at such an angle to avoid being intercepted by the shield 22 when the rotor 13 has been moved to such an extent as to locate the shield on the opposite side of the axis of the rotor, as is the case when the instrument is recording maximum speed.

It has previously been stated that the photoelectric cell 21 is responsive to the source of illumination 20 to actuate the signal 24 through the medium of a relay 23. In this connection attention is called to Figure 3, wherein it will be noted that one side of the relay is connected to the positive pole of a suitable storage battery 35 having the negative pole grounded, as at 36. The other side of the relay is electrically connected to the vibrator 24 through the medium of a contactor 37 designed to periodically interrupt the flow of electrical energy to the vibrator. In the present instance, the contactor 37 comprises a flexible switch arm 38 pivotally supported intermediate the ends thereof and having a contact 39 at the opposite end extending between a pair of fixed contacts 40 and 41. The contact 39 is directly connected to the relay, while the contacts 40 and 41 are respectively electrically connected to the vibrator and to a hot wire resistance 42. One end of the hot wire resistance is grounded, while the opposite end is connected to the free end of the switch arm 38 and to the contact 41. Assuming that the contact 39 on the switch arm 38 is in engagement with the contact 41, it will be noted that an electric circuit is completed through the relay and hot wire resistance 42. As the resistance becomes heated by the current passing therethrough, the same expands permitting the spring 43 to swing the switch arm 38 in a direction to engage the contact 39 with the vibrator contact 40. This breaks the circuit through the hot wire resistance and completes a circuit to the vibrator, causing the latter to operate. Inasmuch as the circuit through the hot wire resistance is open, it necessarily follows that the latter will cool and contract. As the latter contracts, it overcomes the action of the spring 43 and again snaps the contact 39 on the switch arm 38 out of engagement with the contact 40 and into engagement with the contact 41 to again close the circuit through the hot wire resistance. This operation is repeated as long as the relay 23 is maintained closely by the photoelectric cell, and results in periodic operation of the vibrator.

Figure 4:
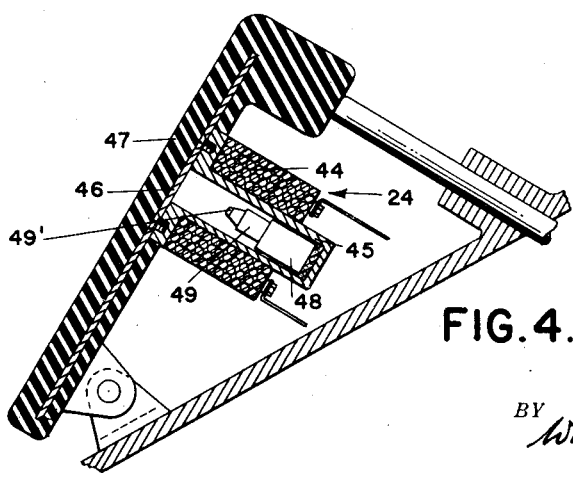
Figure 4 is a longitudinal sectional view through the accelerator pedal featuring the signal.

The vibrator is shown in Figure 4 as comprising a coil 44 surrounding a metallic casing 45 secured to a metallic reinforcing plate 46 embedded in the accelerator pedal 47. Slidably supported within the casing 45 is a relatively soft steel core member 48 having a striker portion 49 of non-magnetic material positioned above the core and equipped with a leather tip 69' for engagement with the steel plate 46 in the accelerator pedal. One lead of the coil is connected to the contact 40 of the contact unit and the opposite lead of the coil is connected to the ground, with the result that when the circuit is closed to the coil 44, the core 48 is moved upwardly by the magnetic field and actuates the striker 49 to impart a tactual signal to that foot of the operator engaged with the accelerator pedal.

Thus, from the foregoing, it will be observed that I have provided a relatively simple and inexpensive signal operated by the speedometer in such a manner as not to interfere with the accuracy or operation of the latter in indicating the speed of the vehicle. It will also be observed that my improved signal is periodically actuated at a preselected speed without interfering with the normal operation of the vehicle or in any way limiting the maximum speed of the vehicle.

What I claim as my invention is:

1. In a speed indicating apparatus, a cylindrical casing, speed responsive means in said casing, a rotatable member in said casing adapted to be rotated into various positions by said speed responsive means, a graduated dial on the face of said casing, a photoelectric cell unit comprising a light source and a photoelectric cell mounted for rotation about the axis of said casing, a light shield mounted on said rotatable member adapted to be rotated into position to intercept light between said source and said photoelectric cell, and a lever on said photoelectric cell unit extending outside the casing to a point adjacent said graduated dial for adjusting said photoelectric cell unit and for indicating relative to said dial a speed at which said light shield will intercept light between said source and said photoelectric cell.

2. In a speed indicating apparatus, a cylindrical casing, speed responsive means in said casing, a rotatable member in said casing adapted to be rotated into various positions by said speed responsive means, a photoelectric cell unit comprising a light source and a photoelectric cell mounted on a ring, a track on the inside of said cylindrical casing to receive said ring, said ring being adjustable in said track, a light shield mounted on said rotatable member, said photoelectric cell and said light source being offset on opposite sides of said ring whereby said shield will intercept the light between said light source and said cell only once during each revolution of said shield.

3. In speed signaling apparatus, a casing, speed responsive means, a rotatable member in said casing adapted to be rotated into various positions by said speed responsive means, a photoelectric cell unit comprising a light source and photoelectric cell mounted in said casing for adjustment about the axis of said rotatable member, a light shield on said member, said light source and said photoelectric cell being disposed on opposite sides of a plane normal to said axis.

4. In speed signaling apparatus, a casing, speed responsive means, a rotatable member in said casing adapted to be rotated into various positions by said speed responsive means, a photoelectric cell unit comprising a light source and photoelectric cell mounted in said casing, a light shield on said member, said light source and said photoelectric cell being disposed on opposite sides of a plane normal to the axis of rotation of said member.

5. In a condition responsive apparatus, a photoelectric cell; a light source adapted to direct light toward said cell; said cell and source being mounted for adjustment as a unit about an axis, being spaced from said axis on opposite sides thereof, and being spaced from each other along said axis; a light shield mounted for rotation about said axis, and positioned relative to said axis such that said shield intercepts light between said source and cell only once in a complete revolution; and condition responsive means adapted to rotate said light shield.

6. In a condition responsive apparatus, a photoelectric cell; a light source adapted to direct light toward said cell; said cell and source being mounted for adjustment as a unit about an axis, being spaced from said axis on opposite sides thereof, and being spaced from each other along said axis; a light shield mounted for rotation about said axis, and positioned relative to said axis such that said shield intercepts light between said source and cell only once in a complete revolution; and condition responsive means adapted to rotate said light shield, said light shield being of substantial peripheral extent so as to intercept said light throughout a substantial range of said condition.

STUART H. CALDWELL.